No. 712,257. Patented Oct. 28, 1902.
J. BURKE.
ARMATURE FOR DYNAMO ELECTRIC MACHINES.
(Application filed Jan. 6, 1900.)
(No Model.)
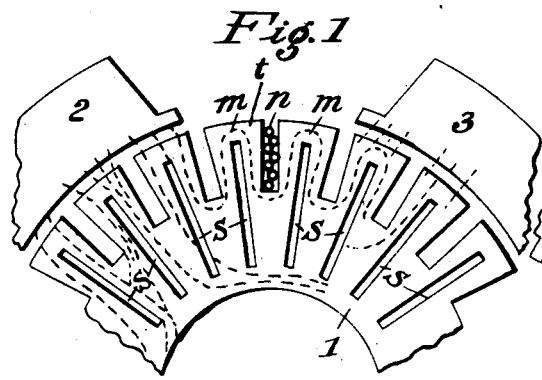
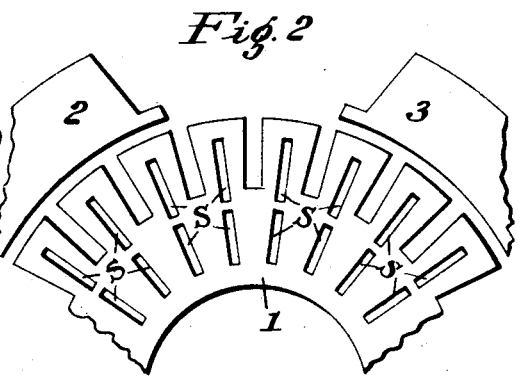
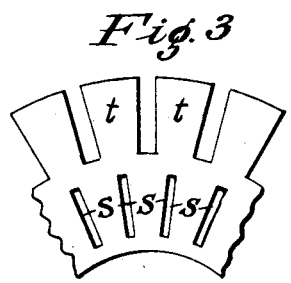
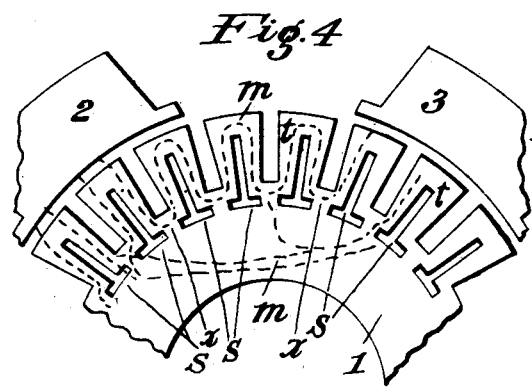
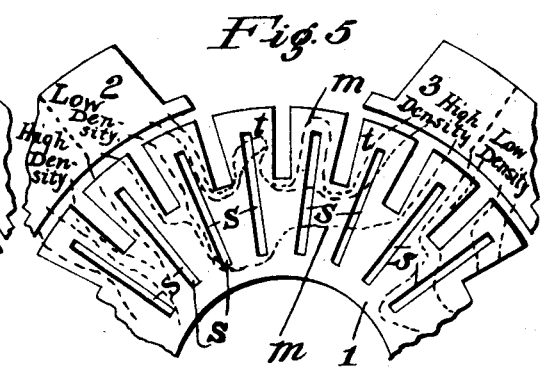
Witnesses
George N. Starr
Charles W. Hildreth
James Burke Inventor
By his Attorney
C. W. Edwards

UNITED STATES PATENT OFFICE.

JAMES BURKE, OF BERLIN, GERMANY.

ARMATURE FOR DYNAMO-ELECTRIC MACHINES.

SPECIFICATION forming part of Letters Patent No. 712,257, dated October 28, 1902.

Application filed January 6, 1900. Serial No. 619. (No model.)

*To all whom it may concern:*

Be it known that I, JAMES BURKE, a citizen of the United States, residing at Berlin, in the Empire of Germany, have invented certain new and useful Improvements in Armatures for Dynamo-Electric Machines, of which the following is a full, clear, and exact specification.

My invention relates to armatures for dynamo-electric machines; and its object is to provide a simple and convenient construction for an armature, whereby the sparking limits of the machine in which the armature is used will be greatly increased.

One of the causes of sparking in a dynamo or motor is the self-induction of the armature-windings as they pass under the brushes and are commutated. This is due to the fact that in commutation the direction of current in the coil commutated is reversed as the coil passes through the commutation zone and under the brush, and this reversal of current reverses the magnetic flux due to said coil. This action produces a voltage in the coil depending upon the amount of change in the magnetism around the coil, the number of turns of wire in the coil, and the rapidity of the reversal. This voltage induced in the coil at reversal as it leaves the brush is one cause of sparking. In toothed armatures this self-induction is much higher than in armatures without teeth, because the magnetic flux above referred to is conducted through the teeth and across the gap between the teeth. The teeth when the coils adjacent to them are passing through the commutation zone generally have no magnetism in them except that from the armature, for at that time they are not under the poles of the machine, but between the same. The magnetic flux due to the armature-coils is therefore relatively high, as the teeth are in a condition of permeability. Consequently in the machines just described the voltage in a coil, due to reversal, is at a maximum.

According to my invention I propose to force a part of the magnetic flux through the armature from the poles of the machine into and through the teeth of the armature when the coils adjacent to the latter are in the commutation zone, and thereby magnetically saturate the teeth. The reversal of current in the armature-coils will therefore have very little effect upon the amount of magnetism in the teeth, inasmuch as the latter will already be saturated. Thus the change in magnetism will be very slight, and the voltage at reversal will be correspondingly slight.

Various structures may be devised for carrying into effect the invention above outlined. In the drawings I have illustrated a few such constructions.

Figures 1 and 5 are detail sectional side views of an armature constructed in accordance with my invention, and Figs. 2, 3, and 4 are similar views illustrating modifications.

Referring more particularly to the drawings, 1 represents a side view of a portion of an armature which may be either of the solid drum type or composed of a plurality of disks. 2 and 3 represent two of the pole-pieces of the machine to which the invention is applied.

It will be understood, of course, that although I have illustrated the device herein as applied to a machine of the conventional four-pole type it may be applied to any design or construction of machine.

$s\ s\ s$, &c., represent a plurality of slots in the armature. These slots are so arranged that the magnetic reluctance which they interpose in the armature will tend to force the magnetic flux through the armature out into the teeth $t$ thereof. Preferably these slots extend radially into, or nearly into, the teeth $t$. In the construction shown in Figs. 1 and 5 the slots are illustrated as simply straight radial slots extending from near the center of the armature-core into the teeth $t$ and nearly to the ends thereof.

It will be seen that the magnetic flux between the poles 2 and 3 will follow the dotted lines $m$, shown in the drawings, causing the flux to substantially divide, a portion thereof passing through the armature near the center and another portion passing around the outer ends of the slots, passing up one side of the tooth and down the other, as shown in dotted lines in Fig. 1, and magnetically saturating the teeth $t$ in the commutation zone between the poles.

In Fig. 1, $n$ represents the coil under commutation. It will be seen that the adjacent teeth are so saturated magnetically that a reversal of current in the coil can set up practically no magnetic flux through the teeth.

In the construction shown in Fig. 2 instead of the slots being continuous they are divided into two or more slots or holes. With this construction a part of the magnetism passes through the iron between the slots and a part is forced up into the teeth, as heretofore described.

In the construction shown in Fig. 3 the slots are located near the core of the armature and do not extend up into the teeth. This arrangement, however, is such that owing to the reluctance near the core the magnetic flux will be forced into the teeth and causes action such as above described.

In Fig. 4 the slots are made T-shaped or widened out at their inner ends. With this construction a part of the magnetism gets through the reduced section $x$ of the core and a part is forced around the teeth by the slots extending into the teeth.

It will be understood, of course, that instead of making the slots straight they may be curved or undulated or arranged in any convenient way to direct a part of the magnetic flux into the armature-teeth, and thereby saturate the same. It will also be understood that the invention may be applied to smooth armature-cores as well as to those of the toothed type. In addition to the prevention of sparking above mentioned the slots will be found to have a good effect in tending to maintain a more uniform distribution of magnetism in the pole-pieces when the machine is loaded. When loaded, the armature reaction in machines of ordinary construction changes the distribution of magnetism in the pole-face, increasing the magnetism at one edge of the pole-face and reducing it at the other. The interposed reluctance, due to slots in the core, reduces the amount of distortion, for the more the distribution is distorted the more reluctance-gaps it has to pass through in the core. If the reaction were such that one-half of the pole was weakened to half the strength of the other half, then the magnetism would have to pass through several reluctance-gaps to reach the high-density half of the pole. This will be illustrated by reference to Fig. 5, wherein the machine being shown under load and the armature revolving in the direction of the arrow the magnetism of the poles will be increased on the side marked "high density" and reduced on the side marked "low density." The greater the distortion of magnetism in the pole-pieces the more reluctance-gaps the flux from the high-density side of the pole will have to pass through in the armature-core to reach the high-density side of the opposite pole, and therefore the reluctance-gaps will tend to direct the magnetism from the high-density side of one pole to the low-density side of the opposite pole, and thus reduce the distortion in the pole-pieces.

It will be understood, of course, that the construction above described may be varied in numerous ways to carry out the invention, and I therefore do not limit myself to the precise construction herein shown.

Having thus described my invention, I declare that what I claim as new, and desire to secure by Letters Patent, is—

1. An armature having means for magnetically saturating the teeth when the coils adjacent thereto are in the commutation zone.

2. An armature having means for diverting the magnetism, or a portion thereof, from the central portion of the armature into the teeth while the latter are in the commutation zone, and thereby magnetically saturating said teeth.

3. An armature having means for directing magnetism from the poles of the machine into the teeth of the armature, when the teeth are in the commutation zone, substantially as and for the purpose set forth.

4. An armature having slots arranged to direct magnetism into the teeth.

5. An armature having interposed reluctance arranged to direct magnetism into the teeth, substantially as described.

6. An armature having a plurality of radial reluctances arranged to direct magnetism into the teeth, as set forth.

7. An armature having a plurality of radial air-gaps for directing magnetism into the teeth, substantially as described.

8. An armature having a plurality of radial air-gaps extending from the core into the teeth, substantially as described.

9. In an armature, the combination of a plurality of teeth, and means, substantially as described, for diverting magnetic flux from the center of the armature into the said teeth.

10. A toothed armature-disk, having a plurality of substantially radial slots extending from the central portion thereof toward the teeth, substantially as described.

11. An armature-disk having a plurality of radial teeth and a plurality of radial slots extending into said teeth from the central portion of the disk, substantially as described.

12. The combination with an armature, of means for magnetically saturating the teeth of the armature at the time the latter are passing through the commutation zone.

13. The combination with an armature, of a plurality of reluctances therein, said reluctances being arranged to interpose greater reluctance between the sides of the opposite pole-pieces having equal magnetic density than between the sides of said pole-pieces having unequal magnetic densities.

14. The combination with an armature, of a plurality of reluctances therein, said reluctances being arranged to direct the magnetism from the high-density side of one pole-piece to the low-density side of the opposite pole-piece.

In testimony whereof I affix my signature in presence of two witnesses.

JAMES BURKE.

Witnesses:
 WOLDEMAR HAUPT,
 HENRY HASPER.